United States Patent [19]

Asai et al.

[11] 4,247,440
[45] Jan. 27, 1981

[54] METHOD FOR PREVENTING PLASTICIZER BLEEDING ON POLYVINYL CHLORIDE SHAPED ARTICLES

[75] Inventors: Michihiko Asai, Fujisawa; Yoshio Suda, Hachioji; Kiyoshi Imada, Omiya; Susumu Ueno; Hirokazu Nomura, both of Ibaragi, all of Japan

[73] Assignees: Agency of Industrial Science and Technology; Shin-Etsu Chemical Co., Ltd., both of Japan

[21] Appl. No.: 59,756

[22] Filed: Jul. 23, 1979

[30] Foreign Application Priority Data

Jul. 27, 1978 [JP] Japan ................................. 53-91905

[51] Int. Cl.$^3$ .......................... C08J 3/28; C08K 5/09; C08J 3/18
[52] U.S. Cl. ............................... 260/31.8 R; 204/165; 528/483; 260/30.6 R; 260/34.2
[58] Field of Search .................. 204/165; 260/31.8 R, 260/30.6 R; 528/483

[56] References Cited

U.S. PATENT DOCUMENTS

| | | | |
|---|---|---|---|
| 2,966,469 | 12/1960 | Smythe et al. | 204/165 |
| 3,661,735 | 5/1972 | Drelich | 204/165 |
| 3,829,324 | 8/1974 | Blais et al. | 204/165 |

OTHER PUBLICATIONS

Techniques and Applications of Plasma Chemistry, pp. 138-140, Hollohan, Bell, Eds., John Wiley & Sons.
Adhesive Age, Mar., 1972, pp. 37-40, R. Q. Bersin.

Primary Examiner—Joseph L. Schofer
Assistant Examiner—Peter F. Kulkosky
Attorney, Agent, or Firm—McGlew and Tuttle

[57] ABSTRACT

In the inventive method, shaped articles of a plasticized polyvinyl chloride resin are subjected to the surface treatment by with low temperature plasma so that the undesirable phenomenon of bleeding of the plasticizer on the surface can be effectively prevented when the plasticizer for plasticizing the resin is a compound having at least one aromatic nucleus in a molecule or a combination of two or more of plasticizers including 10% by weight or more of a plasticizer which is a compound having at least one aromatic nucleus in a molecule.

12 Claims, No Drawings

METHOD FOR PREVENTING PLASTICIZER BLEEDING ON POLYVINYL CHLORIDE SHAPED ARTICLES

BACKGROUND OF THE INVENTION

The present invention relates to a method for preventing the bleeding of a plasticizer on the surface of shaped articles of plasticized polyvinyl chloride resins or, in particular, to a method for preventing bleeding of a plasticizer on the surface of shaped articles of polyvinyl chloride resins plasticized with a plasticizer having at least one aromatic nucleus in a molecule by the modification of the surface properties of the shaped articles.

Polyvinyl chloride resins are one of the most important classes of thermoplastic synthetic resins used for manufacturing various kinds of shaped articles useful in a very wide field of applications. Shaped articles of polyvinyl chloride resins are classified as a rigid type ones and a flexible type according to the absence or presence of a substantial amount of a plasticizer in the resin compositions. The rigidity or flexibility of shaped articles of a polyvinyl chloride resin can be controlled by the incorporation of a plasticizer such as a phthalic ester. Polyvinyl chloride resins thus plasticized are fabricated into various kinds of flexible articles including films, sheets, synthetic leathers, tubes, hoses, bags, packings, covering materials and the like directed to the uses in the fields of medical and sanitary wares, cooking wares, wrapping materials for foodstuffs, insulation of electric wires and cables, materials used in agricultural plant growing, materials for buildings and the like.

One of the most difficult problems involved in the shaped articles of plasticized polyvinyl chloride resins is the so-called bleeding of the plasticizer contained therein. Bleeding is a phenomenon by which the plasticizer contained in the body of the shaped article migrates with time toward the surface of the article and is lost by evaporation into the atmosphere or by transfer to another body in contact with the shaped article. This phenomenon of bleeding of the plasticizer, as well as of the other additives contained in the shaped articles detrimentally affects the appearance as well as various mechanical or physical properties and may result in a shortened serviceable life of the articles.

The phenomenon of bleeding is especially undesirable when the shaped article is to be used with a medical purpose such as a bag or container of blood for transfusion or to be used in contact with foodstuffs because of the toxicity of the plasticizer and other additives presenting limitations to the application of polyvinyl chloride resins.

Various attempts have been made hitherto to decrease the bleeding of plasticizers and other additives on the surface of articles utilizing the irradiation with ionizing radiations or ultraviolet light, corona discharge at a relatively high gas pressure, e.g. larger than 100 Torr, and treatment with chemicals. These prior art methods are to some extent effective for improving various surface properties of articles of polyvinyl chloride resins such as heat resistance, anti-solvent resistance, affinity with water, electrostatic charging, printability and the like. However, the effectiveness of these methods in preventing plasticizer bleeding is rather small. Moreover, it is sometimes unavoidable that advantageous properties of the shaped articles of polyvinyl chloride resins are adversely affected by these methods.

For example, the irradiation with an ionizing radiation produces crosslinks in the surface layer as well as in the body of the article. The high energy of the radiation results resulting in undesirable changes in the mechanical properties of the plasticized polyvinyl chloride resins. Irradiation with ultraviolet light is adversely affects in the coloring of the surface due to the oxidative degradation taking place in the surface layer of the articles. The treatment with corona discharge is not practicable due to the large difficulty in the process control owing to the rather unstable nature inherent to the discharge. Further, chemical means are not free from the problems of erosion by the chemicals or poor adhesiveness or durability of the coating compositions.

SUMMARY OF THE INVENTION

It is therefore an object of the present invention to provide a novel and effective means for preventing bleeding of plasticizers on the surface of shaped articles of a plasticized polyvinyl chloride resin or, in particular, of a polyvinyl chloride resin plasticized with a plasticizer which is a compound having at least one aromatic nucleus in a molecule or with a combination of two or more plasticizers of which such an aromatic plasticizer is one of the components to such an extent that the shaped article can be used in medical applications or in contact with foodstuffs and beverages.

Thus, the present invention provides a method for preventing bleeding of a plasticizer on the surface of a shaped article of polyvinyl chloride resins plasticized with at least 20 parts by weight, per 100 parts by weight of the resin, of a plasticizer which is a compound having at least one aromatic nucleus in a molecule or of a combination of plasticizers of which at least 10% by weight or more of the total amount of the plasticizers includes a plasticizer which is a compound having at least one aromatic nucleus in a molecule, which method comprises subjecting the shaped article to a treatment with low temperature plasma of a gas.

DETAILED DESCRIPTION OF THE PREFERRED EMBODIMENTS

The present invention has been completed on the basis of the unexpected discovery by the inventors that bleeding of a plasticizer on the surface of the shaped articles of plasticized polyvinyl chloride resins can be effectively prevented by the treatment with low temperature plasma only when the plasticizer used for plasticizing the polyvinyl chloride resin is a compound having at least one aromatic nucleus in a molecule such as esters of phthalic acid or at least 10% by weight of the plasticizers is such an aromatic nucleus containing compound. Stated otherwise, the beneficial effects cannot be expected when 90% by weight or more of the plasticizers is a compound having no aromatic nucleus such as esters of aliphatic dicarboxylic acids, e.g. dioctyl adipate and the like, or esters of aliphatic monocarboxylic acids, e.g. tributyl acetylcitrate and the like, by the treatment with low temperature plasma on the surface properties of shaped articles to prevent of bleeding of the plasticizers on the surface.

The polyvinyl chloride resins used in the fabrication of shaped articles applicable in the inventive method are not particularly limited to certain specific types of polyvinyl chloride resins. Applicable polyvinyl chloride resins include homopolymers of vinyl chloride of various degrees of polymerization as well as copolymers of vinyl chloride with one or more of copolymerizable comonomers insofar as the main component, say, 50% by weight or more, of the copolymer is vinyl chloride. The comonomers copolymerizable with vinyl chloride are well known in the art and exemplified by vinyl esters such as vinyl acetate, vinyl ethers such as vinylethyl ether, acrylic and methacrylic acids and esters thereof, maleic and fumaric acids and esters thereof, maleic anhydride, aromatic vinyl compounds such as styrene, vinylidene halides such as vinylidene chloride, acrylonitrile, methacrylonitrile, olefins such as ethylene and propylene, and the like.

On the other hand, the polyvinyl chloride resin composition for shaping the articles should contain about 20 parts by weight or more, per 100 parts by weight of the polyvinyl chloride resin, of a plasticizer which is a compound having at least one aromatic nucleus, e.g. benzene nucleus, in a molecule exemplified by esters of phthalic acid such as dimethyl phthalate, diethyl phthalate, dibutyl phthalate, diisobutyl phthalate, diheptyl phthalate, di(2-ethylhexyl) phthalate, diisooctyl phthalate, di-n-octyl phthalate, dinonyl phthalate, diisodecyl phthalate, ditridecyl phthalate, dicyclohexyl phthalate, butylbenzyl phthalate, butyllauryl phthalate, mixed ester of phthalic acid with alcohol having 7 to 10 carbon atoms and the like, esters of trimellitic acid such as trimethyl trimellitate, trioctyl trimellitate and the like, phosphoric acid esters of phenols such as tricresyl phosphate, triphenyl phosphate and the like, ethylphthalyl ethylglycolate, butylphthalyl butylglycolate, diethyleneglycol dibenzoate and the like.

It is not always necessary that all of the plasticizers contained in the plasticized polyvinyl chloride resin be in the above mentioned aromatic nucleus-containing compounds. It is sufficient that the aromatic nucleus-containing plasticizers be combined with plasticizers having no aromatic nucleus provided that 10% by weight or more of the total amount of the plasticizers is constituted by the aromatic nucleus-containing plasticizers in order to obtain satisfactory results by the treatment with low temperature plasma. Moreover, the use of non-aromatic plasticizers in combination with aromatic plasticizers is recommended when improved mechanical properties of the shaped articles, especially, at low temperatures are desired.

Plasticizers having no aromatic nucleus in the molecule are exemplified by esters of aliphatic dicarboxylic acids such as dioctyl adipate, diisodecyl adipate, dioctyl azelate, dioctyl sebacate and the like, esters of aliphatic monocarboxylic acids such as butyl oleate, methyl acetylricinolate, methyl esters of chlorinated carboxylic acids, methyl esters of methoxychlorinated carboxylic acids and the like, and related compounds. The amount of these non-aromatic plasticizers is, when used, limited to less than 10% by weight of the total amount of the plasticizers in consideration of the bleeding-preventing effect obtained by the treatment with low temperature plasma although it is recommended that the weight ratio of the aromatic plasticizers to the non-aromatic plasticizers is in the range from 20:80 to 80:20 in order to obtain a good balance of the low temperature properties and the bleeding-preventing effect of the shaped articles.

The compositions of the plasticized polyvinyl chloride resins used for fabricating the shaped articles in the present invention may be formulated, in addition to the above described plasticizers, with various kinds of additives according to need. For example, additives which contributes to improvement of properties such as heat stability, lubricity, weathering resistance and the like, are exemplified by metal soaps such as calcium stearate, zinc stearate, lead stearate, barium stearate, cadmium stearate and the like, tribasic lead sulfate, dibasic lead phosphite, organotin compounds such as dibutyltin dilaurate, dibutyltin dimaleate, di-n-octyltin mercaptide, dimethyltin mercaptide and the like as a stabilizer, and esters such as butyl stearate, aliphatic acid amides such as ethylene bisstearoamide, higher fatty acids such as stearic acid and polyethylene waxes as a lubricant, fillers, anti-oxidants, ultraviolet absorbers, anti-static agents, anti-fogging agent, pigments, dyestuffs, cross-linking aids and the like.

Furthermore, the compositions of the plasticized polyvinyl chloride resins may be formulated with certain kinds of high-polymeric rubbery elastomers with the object to improve the properties of the shaped articles fabricated therewith. Suitable rubbery elastomers are exemplified by copolymers of ethylene and vinyl acetate, copolymers of acrylonitrile and butadiene, copolymers of styrene and acrylonitrile, copolymers of methyl methacrylate, styrene and butadiene, copolymers of acrylonitrile, styrene and butadiene, copolymeric elastomers of ethylene and propylene, copolymeric elastomers of ethylene, propylene and a dienic monomer and the like.

The shaped articles subjected to the inventive method are not limited by of the method of fabrication thereof. Any conventional fabrication techniques can be applied to form the shapes of the desired articles including extrusion molding, injection molding, calendering, inflation method, blow molding, compression molding, vacuum forming and the like. The shapes of the articles are also not limited although articles with complicated shapes, for example, with concavity may require specific elaboration in order to ensure uniformity, the treatment with low temperature plasma.

A shaped article of plasticized polyvinyl chloride resin as described above, is subjected to a treatment with low temperature plasma. Low temperature plasma is well known in the art as a gaseous atmosphere full of electrically charged species where the temperature of the gaseous atmosphere is not excessively high in comparison with the ambient temperature irrespective of the energies of the charged species per se. Low temperature plasma is produced mainly by glow discharge in a gaseous atmosphere of a pressure in the range from 0.001 to 10 Torr where the frequency of the electric power supply for the discharge is unlimited ranging from direct current to the microwave region. In particular, a frequency of the so-called high frequency region is recommended due to the availability of generators with sufficient power output and the possibility of obtaining stable plasma discharge. For example, a frequency of 13.56 MHz or 27.12 MHz is recommended since these frequencies are relatively free from the statutory regulations for radio waves.

The shapes and arrangement of the electrodes are unlimited provided that as a stable plasma discharge can be ensured within the space in which the surface of the shaped article is treated with, i.e. exposed to, the plasma atmosphere. Thus, a pair of inside electrodes, a pair of exterior electrodes and a coiled electrode may be used according to particular types of the apparatuses for plasma generation. The electrodes may be connected to the high frequency generator either by capacitive coupling or inductive coupling.

The intensity or power density of the low temperature plasma and the time required for the plasma treatment are interrelated parameters but extreme difficulties are encountered in explicitly defining the power density of low temperature plasma due to the very complicated nature of the plasma discharge beyond the understanding in the present status of the art. Therefore, it is the best approach that the time for the plasma treatment is determined in advance by a careful preparatory experiment in which several parameters including the supplied electric power are selected according to the specific purposes. With the power density obtained in most of the currently available apparatuses for plasma generation, a time ranging from a few second to several tens of minutes is usually sufficient for obtaining the objective effect of the invention. In any case, it is a minimum requirement that the surface of the shaped articles never be thermally degraded by the heat evolved by the plasma discharge.

The other parameters to be taken into consideration in the plasma treatment are the kind of the gaseous constituents and the pressure of the gaseous atmosphere. The pressure of the gaseous atmosphere within the apparatus for plasma generation should be maintained in a range from 0.001 to 10 Torr or, preferably, from 0.1 to 1.0 Torr in order to ensure stability of the plasma discharge. The gases filling the apparatus under the above specified pressure is either inorganic or organic as exemplified by helium, neon, argon, nitrogen, nitrous oxide, nitrogen dioxide, oxygen, air, carbon monoxide, carbon dioxide, hydrogen, halogens, e.g. chlorine, and halogen compounds, e.g. hydrogen chloride, as well as olefins, e.g. ethylene and propylene, halogenated hydrocarbons, e.g. fluorocarbons, aromatic hydrocarbons, e.g. benzene, heterocyclic organic compounds, e.g. pyridine, organosilanes and the like. Among the above named gases, the inorganic gases are preferred to the organic ones due to the absence of coloration on the surface of the plasma-treated articles and formation of a powdery polymerized matter. In particular, helium, argon, carbon monoxide, carbon dioxide and hydrogen, especially, carbon monoxide, are preferred because of the higher efficiency by an unknown mechanism. These gases are used either singly or as a mixture of two or more. When a mixed gas is used, it is recommended that one of the components is carbon monoxide.

The shaped articles obtained by the above described procedures of the inventive method have a markedly reduced tendency of plasticizer bleeding on the surface and experience no transfer of the plasticizer to another body in contact therewith. In addition, the flexibility of the surface layer which constitutes the barrier layer for the plasticizer is not lost because of the adequate density of crosslinks with good heat-sealability and weathering resistance as well as good mechanical properties, especially, at low temperatures, such as tensile strength, resistance against scratches, impact strength and the like is maintained. Further, the shaped articles obtained by the inventive method have excellent surface properties such as improved affinity with water, reduced tendency of being stained and good resistance against oils and chemicals.

The following examples will further illustrate the present invention. In the examples parts are all parts by weight. Table 1 referred to in each example is given after the last example.

EXAMPLE 1

(Samples No. 1 and No. 2)

A resin composition was prepared by intimately blending 100 parts of homopolymeric polyvinyl chloride resins having an average degree of polymerization of about 1,000 (TK-1000, a trade name by Shin-Etsu Chemical Co., Japan), 40 parts of dioctyl adipate (hereinafter abbreviated as DOA), 10 parts of dioctyl phthalate (hereinafter abbreviated as DOP), 1.5 parts of calcium stearate and 1.5 parts of zinc stearate in a roller mill at 160° C. for 10 minutes and the resin composition was fabricated by press molding at 165° C. into a sheet of 1 mm thickness.

A 10 cm by 10 cm piece of the thus prepared sheet was placed on the lower electrode of 20 cm diameter facing the upper electrode with a distance of 3 cm in an apparatus for plasma generation and low temperature plasma was generated by a high frequency power supply of 100 watts at a frequency of 13.56 MHz for 10 minutes while the pressure in the apparatus was maintained at 0.2 Torr by passing carbon monoxide gas with simultaneous evacuation with a pump.

The resin sheets before the plasma treatment (Sample No. 1) and after the plasma treatment (Sample No. 2) were then each subjected to a test for the plasticizer bleeding in the manner described below. Thus, a suitably cut resin sheet was placed on the bottom of a cylindrical extraction vessel, in the case of Sample No. 2, with the plasma-treated surface facing upside, and set so that 26 $cm^2$ of the upper surface thereof alone came into contact with the extraction solvent introduced into the vessel and then 5 ml of n-hexane was introduced into the vessel with subsequent shaking at 37° C. for 2 hours. The concentration of the plasticizers in the extract solution was determined by gas chromatography to give the results set out in Table 1 in mg/$cm^2$.

EXAMPLE 2

(Samples No. 3 and No. 4)

The experimental procedures were repeated as in Example 1 except that the formulation of the plasticizers was changed to 25 parts of DOA and 25 parts of DOP. The results of an extraction test with the resin sheet before the plasma treatment (Sample No. 3) and after the plasma treatment (Sample No. 4) are set forth in Table 1.

COMPARATIVE EXAMPLE 1

(Sample No. 5)

The experimental procedures were the same as in Example 1 except that DOP in the formulation of the resin composition was omitted and, instead, the amount of DOA was increased to 50 parts. The extraction test with n-hexane for this sheet (Sample No. 5) gave the results set out in Table 1.

EXAMPLE 3

(Samples No. 6 and No. 7)

The experimental procedures were the same as in Example 1 except that the formulation of the plasticizers in the resin composition was changed to 20 parts of DOA and 5 parts of DOP and the pressure of carbon monoxide during the plasma treatment was 0.5 Torr instead of 0.2 Torr. The extraction test with n-hexane was carried out with the resin sheets before the plasma treatment (Sample No. 6) and after the plasma treatment (Sample No. 7) to give the results set out in Table 1.

COMPARATIVE EXAMPLE 2

(Sample No. 8)

The experimental procedures were the same as in Example 3 except that DOP in the formulation of the resin composition was omitted and, instead, the amount of DOA was increased to 25 parts as well as that the high frequency power supplied to the electrodes was decreased to 50 watts. The extraction test with n-hexane carried out with this sheet (Sample No. 8) yielded results set out in Table 1.

EXAMPLE 4

(Samples No. 9 and No. 10)

The experimental procedures were the same as in Example 1 except that DOA in the formulation of the resin composition was replaced with the same amount of di(2-ethylhexyl) sebacate (hereinafter abbreviated as DOS) and the high frequency power supplied to the electrodes was increased to 150 watts. The extraction test with n-hexane was carried out with the resin sheets before the plasma treatment (Sample No. 9) and after the plasma treatment for 5 minutes (Sample No. 10) to give the results set out in Table 1.

COMPARATIVE EXAMPLE 3

(Sample No. 11)

The experimental procedures were the same as in Example 4 except that DOP in the formulation of the resin composition was omitted and, instead, the amount of DOS was increased to 50 parts. The extraction test with n-hexane was carried out with this resin sheet (Sample No. 11) to give the results set out in Table 1.

EXAMPLE 5

(Samples No. 12 and No. 13)

The formulation of the resin composition was the same as in Example 4 except that DOP in the formulation was replaced with the same amount of tri(2-ethylhexyl) trimellitate (hereinafter abbreviated as TOTM) and the treatment of the resin sheet with low temperature plasma was carried out in argon atmosphere instead of carbon monoxide under a reduced pressure of 0.5 Torr and with the high frequency power of 150 watts for 5 minutes. The extraction test with n-hexane was carried out with the resin sheets before the plasma treatment (Sample No. 12) and after the plasma treatment (Sample No. 13) to give the results set out in Table 1.

COMPARATIVE EXAMPLE 3

(Sample No. 14)

The experimental procedures were the same as in Example 4 except that TOTM in the formulation of the resin composition was omitted and, instead, the amount of DOS was increased to 50 parts. The extraction test with n-hexane was carried out with this resin sheet (Sample No. 14) to give the results set out in Table 1.

EXAMPLE 6

(Samples No. 15 and No. 16)

The experimental procedures were the same as in Example 1 except that DOA in the formulation of the resin composition was omitted and, instead, the amount of DOP in the formulation was increased to 50 parts. The extraction test with n-hexane was carried out with the resin sheets before the treatment with low temperature plasma (Sample No. 15) and after the treatment (Sample No. 16) to give the results set out in Table 1.

EXAMPLE 7

(Samples No. 17 and No. 18)

A resin composition composed of 100 parts of a homopolymeric polyvinyl chloride resin having an average degree of polymerization of about 1,300 (TK-1300, a trade name by Shin-Etsu Chemical Co., Japan), 40 parts of DOP, 10 parts of tricresyl phosphate (hereinafter abbreviated as TCP), 1.5 parts of calcium stearate and 1.5 parts of zinc stearate was fabricated into a sheet of 1 mm thickness in the same manner as in Example 1.

The plasma treatment of the thus prepared sheet was carried out in the same manner as in Example 1 except that the pressure of carbon monoxide was maintained at 0.4 Torr and the high-frequency power was 150 watts. The extraction test with n-hexane was carried out with the resin sheet before the plasma treatment (Sample No. 17) and the sheet after the plasma treatment (Sample No. 18) to give the results set out in Table 1.

TABLE 1

| Sample No. | Plasticizer formulated, parts by weight | | | | | Plasma treatment | | | Plasticizer extracted, mg | | | | |
|---|---|---|---|---|---|---|---|---|---|---|---|---|---|
| | DOA | DOP | DOS | TOTM | TCP | Gaseous atmosphere | Pressure, Torr | High-frequency power, watts | DOA | DOP | DOS | TOTM | TCP |
| 1 | 40 | 10 | — | — | — | Not treated | | | 85 | 20 | — | — | — |
| 2 | 40 | 10 | — | — | — | Carbon monoxide | 0.2 | 100 | 23 | 5 | — | — | — |
| 3 | 25 | 25 | — | — | — | Not treated | | | 50 | 53 | — | — | — |
| 4 | 25 | 25 | — | — | — | Carbon monoxide | 0.2 | 100 | 1.1 | 0.2 | — | — | — |
| 5 | 50 | — | — | — | — | Carbon monoxide | 0.2 | 100 | 93 | — | — | — | — |
| 6 | 20 | 5 | — | — | — | Not treated | | | 18 | 10 | — | — | — |
| 7 | 20 | 5 | — | — | — | Carbon monoxide | 0.5 | 50 | 0.6 | 0.05 | — | — | — |
| 8 | 25 | — | — | — | — | Carbon monoxide | 0.5 | 50 | 53 | — | — | — | — |
| 9 | — | 10 | 40 | — | — | Not treated | | | — | 19 | 76 | — | — |
| 10 | — | 10 | 40 | — | — | Carbon monoxide | 0.2 | 150 | — | 5 | 20 | — | — |
| 11 | — | — | 50 | — | — | Carbon monoxide | 0.2 | 150 | — | — | 96 | — | — |
| 12 | — | — | 40 | 10 | — | Not treated | | | — | — | 83 | 18 | — |
| 13 | — | — | 40 | 10 | — | Argon | 0.5 | 150 | — | — | 15 | 3 | — |

TABLE 1-continued

| Sample No. | Plasticizer formulated, parts by weight | | | | | Plasma treatment | | | Plasticizer extracted, mg | | | | |
|---|---|---|---|---|---|---|---|---|---|---|---|---|---|
| | DOA | DOP | DOS | TOTM | TCP | Gaseous atmosphere | Pressure, Torr | High-frequency power, watts | DOA | DOP | DOS | TOTM | TCP |
| 14 | — | — | 50 | — | — | Argon | 0.5 | 150 | — | — | 103 | — | — |
| 15 | — | 50 | — | — | — | Not treated | | | — | 63 | — | — | — |
| 16 | — | 50 | — | — | — | Carbon monoxide | 0.2 | 100 | — | 0.02 | — | — | — |
| 17 | — | 40 | — | — | 10 | Not treated | | | — | 85 | — | — | 22 |
| 18 | — | 40 | — | — | 10 | Carbon monoxide | 0.4 | 150 | — | 0.07 | — | — | 0.2 |

What is claimed is:

1. A method for preventing bleeding of a plasticizer on the surface of a shaped article of a polyvinyl chloride resin plasticized with at least 20 parts by weight, per 100 parts by weight of the polyvinyl chloride resin, of a plasticizer which is a compound having at least one aromatic nucleus in a molecule, which method comprises exposing the surface of the shaped article to be treated to a low temperature plasma of an inorganic gas at a pressure in the range from 0.001 to 10 Torr.

2. The method as claimed in claim 1, wherein the pressure of the gas for the low temperature plasma is in the range from 0.1 to 1 Torr.

3. The method as claimed in claim 1 wherein the inorganic gas for the low temperature plasma is carbon monoxide.

4. The method as claimed in claim 1 wherein the inorganic gas for the low temperature plasma is a mixed gas containing carbon monoxide.

5. The method as claimed in claim 1 further comprising the step of generating said low temperature plasma by glow discharge at a high frequency power supply in the range of 50 to 150 watts.

6. A method for preventing bleeding of a plasticizer on the surface of a shaped article of a polyvinyl chloride resin plasticized with at least 20 parts by weight per 100 parts by weight of the polyvinyl chloride resin, of a combination of plasticizers including at least 10% by weight of a plasticizer which is a compound having at least one aromatic nucleus in a molecule, which method comprises exposing the surface of the shaped article to be treated to a low temperature plasma of an inorganic gas at a pressure in the range 0.001 to 10 Torr.

7. The method as claimed in claim 6 wherein the pressure of the gas for the low temperature plasma is in the range from 0.1 to 1 Torr.

8. The method as claimed in claim 6, wherein the inorganic gas for the low temperature plasma is carbon monoxide.

9. The method as claimed in claim 6, wherein the inorganic gas for the low temperature plasma is a mixed gas containing carbon monoxide.

10. The method of claim 6 wherein said plasticizers includes aromatic plasticizers and non-aromatic plasticizers, and the weight ratio of the aromatic plasticizers to the nonaromatic plasticizers ranges from 20:80 to 80:20.

11. The method as claimed in claim 6 further comprising the step of generating said low temperature plasma by glow discharge at a high frequency power supply in the range of 50 to 150 watts.

12. The method as claimed in claim 11 wherein said exposing step comprises exposing the surface to a low temperature plasma for a period of 5 to 10 minutes.

* * * * *